Feb. 28, 1967  E. S. WIESZECK  3,305,964
THERMALLY-RESPONSIVE FISHING LURE
Filed July 10, 1963  3 Sheets-Sheet 1
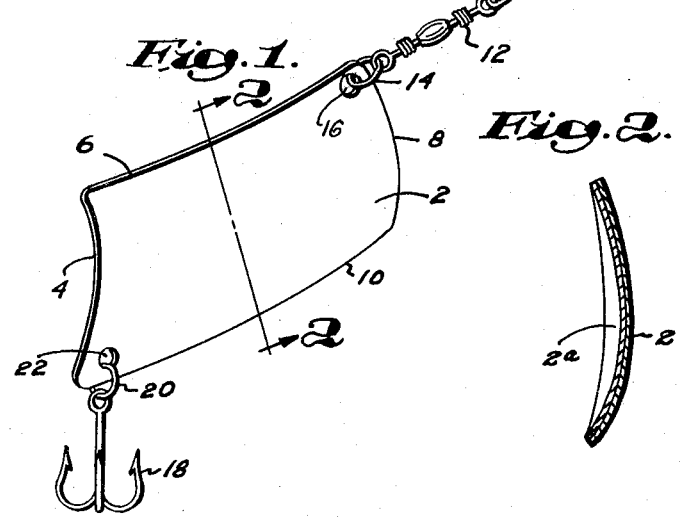
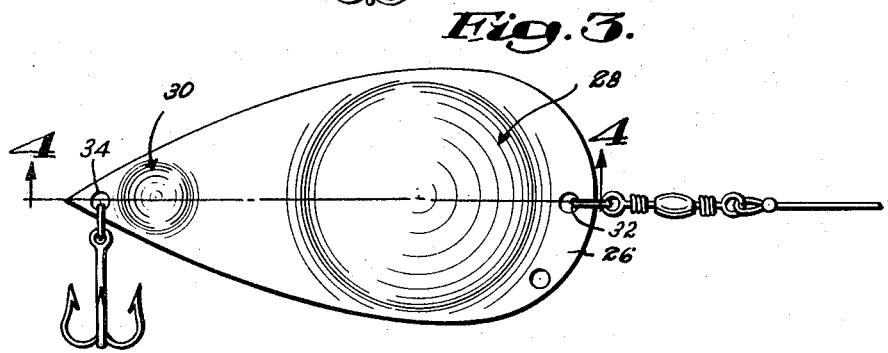
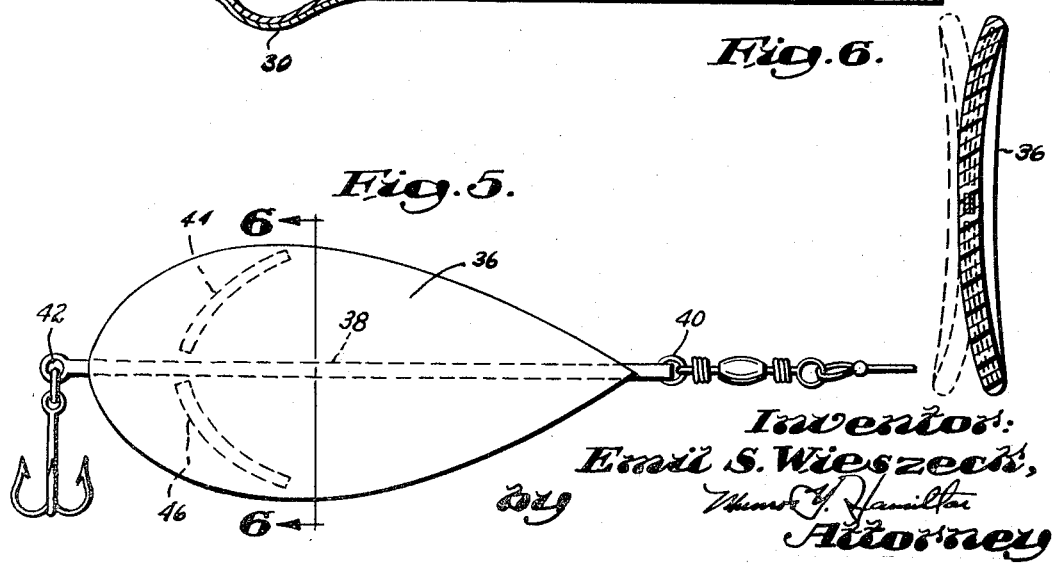
Inventor:
Emil S. Wieszeck,
Attorney

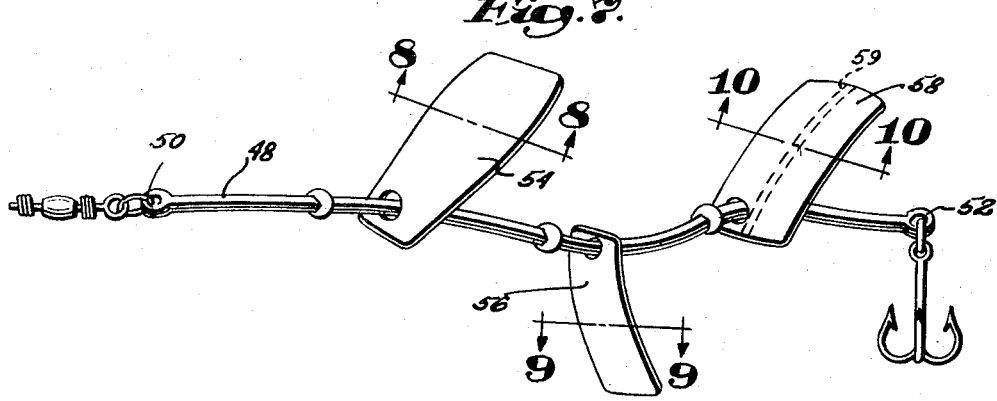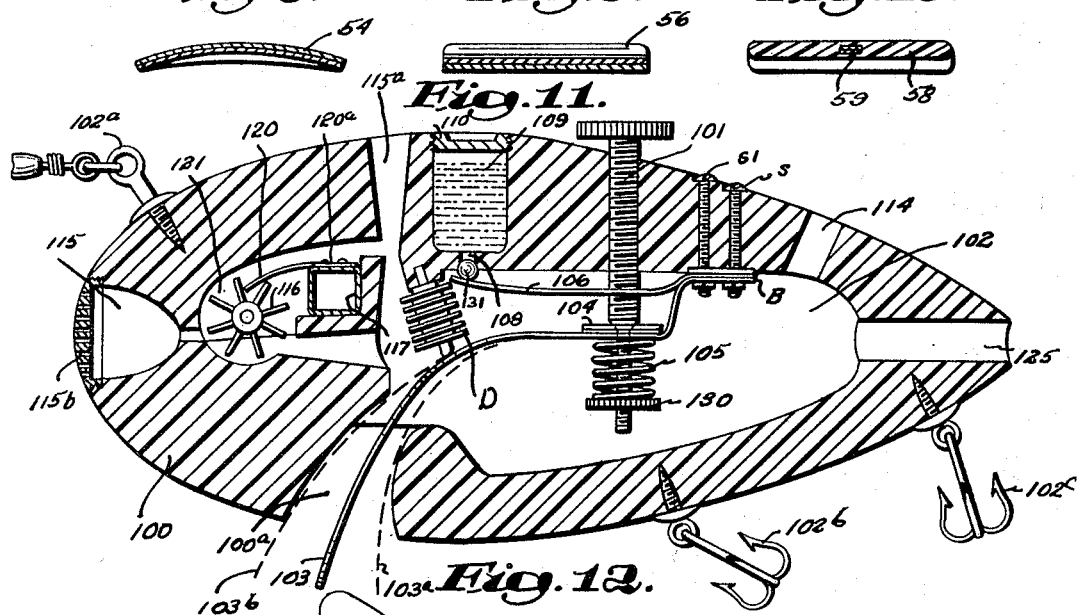

Feb. 28, 1967  E. S. WIESZECK  3,305,964
THERMALLY-RESPONSIVE FISHING LURE
Filed July 10, 1963  3 Sheets-Sheet 3
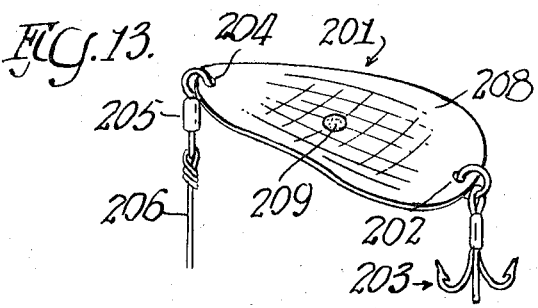
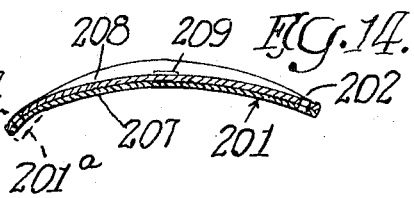
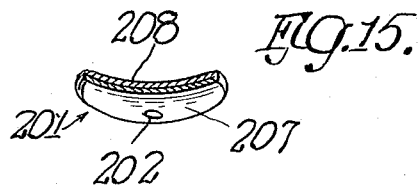
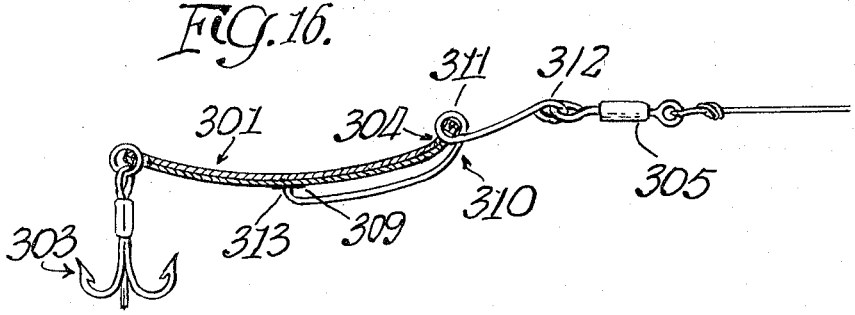
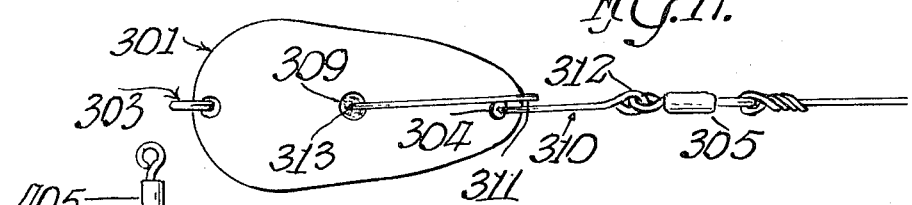
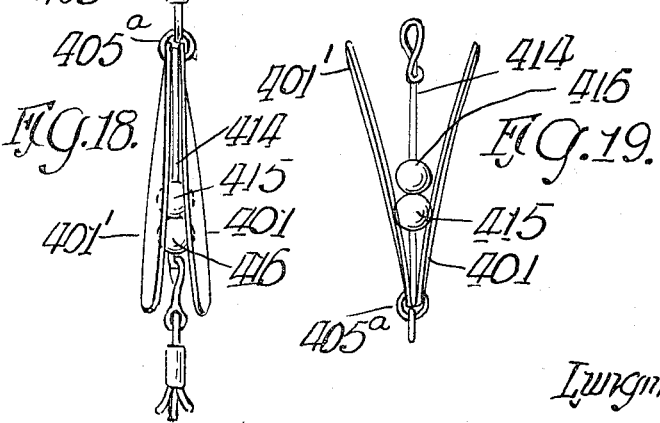
INVENTOR.
EMIL S. WIESZECK
BY Dawson, Tilton, Fallon,
Lungmus & Alexander Attys

United States Patent Office 3,305,964
Patented Feb. 28, 1967

3,305,964
THERMALLY-RESPONSIVE FISHING LURE
Emil S. Wieszeck, Box 175, Salem, N.H. 03079
Filed July 10, 1963, Ser. No. 295,284
5 Claims. (Cl. 43—42.03)

This application is a continuation-in-part of my copending application, Serial No. 82,188, filed January 12, 1961, now abandoned.

This invention relates to a fish lure of the general class employed in trolling, casting, and the like, and, more particularly, to a lure body or component thereof which is responsive or sensitive to temperature and which will undergo changes due to thermal differentials of the water in which the lure may be located.

Thermal strata or differentials are known to exist in bodies of water—due to the action of the sun, currents, wind, etc. It is also known that certain species of fish seek a particular thermal stratum, and it is a principal object of this invention to utilize this hitherto-unused phenomenon in providing a significantly advantageous fish lure.

Another object of the invention is to provide a fishing lure which is sensitive or responsive to the water temperature through which the lure is drawn so as to cause the lure to adopt a certain predetermined form of activity, i.e., relocation, reorientation, etc.

Still another object of the invention is to provide a fish lure incorporating a bimetal wherein the bimetal is responsive to thermal differentials in the water whereby the bimetal changes shape to afford a desired activity of the lure. In one aspect, this desired activity may be the positioning of the lure at a certain depth. In another aspect, it may be change of shape of the lure itself so as to simulate a darting movement of the lure and thereby attract a fish.

Yet another object of the invention is to provide a fishing lure body with a bimetallic element in such a manner as to trigger any one of various operations, such as moving from one desired fishing depth to another, releasing a fish bait, producing sound and color changes under water, and various other activities.

A further object is to provide unique curvatures in a bimetallic fish lure.

A still further object of the invention is to provide an elongated, tapered fish lure constructed of bimetallic material stressed to develop novel contours therein, particularly at the narrow end thereof.

A further object is to provide a stressed bimetal fish lure equipped with means for changing the strains therein.

Other objects and advantages of the invention will be found in the description and operation set down in this specification.

The invention is described in conjunction with the accompanying drawings, in which:

FIG. 1 is a perspective view of one form of fishing lure of the invention;

FIG. 2 is a cross section taken on the line 2—2 of FIG. 1;

FIG. 3 is a plan view of another form of lure;

FIG. 4 is a cross section taken on the line 4—4 of FIG. 3;

FIG. 5 is a plan view of another form of lure;

FIG. 6 is a cross section taken on the line 6—6 of FIG. 5;

FIGS. 7, 8, 9 and 10 illustrate a multi-piece form of lure of the invention;

FIGS. 11 and 12 illustrate still other modified forms of thermally-actuated fishing lures;

FIG. 13 is a perspective view of another lure of the invention;

FIG. 14 is a longitudinal sectional view of the lure of FIG. 13 in an intermediate stage of fabrication;

FIG. 15 is a transverse sectional view of the lure of FIG. 13, also at an intermediate stage in the fabrication thereof and subsequent to that shown in FIG. 14;

FIG. 16 is an elevational view of still another lure constructed according to the invention;

FIG. 17 is a plan view of the lure of FIG. 16;

FIG. 18 is an elevational view of a further modified form of lure made according to the invention; and FIG. 19 is a view of the lure of FIG. 18 but in inverted form and in different operative conditions.

In accordance with the invention, I provide a specially formed bimetallic member which is combined with a hook and line. The bimetallic member is arranged in such a manner that a change in shape may be induced in response to variation in temperature of water through which the fishing lure is moved, and the change in shape in turn produces a change in characteristic motion of the lure as it moves through the water.

In one simplified version of the invention, I construct the lure body in the form of a bimetallic sheet which is of the special configuration shown so as to produce a particular kind of luring movement when drawn through the water. In FIGS. 1 and 2, I have illustrated this simplified version of lure in which the numeral 2 denotes a thin bimetallic body which is formed (i.e., dished) as at 2a. This body is formed with four marginal edges 4, 6, 8 and 10, and has the edges 4 and 8 curved to provide a dished or arched shape. When the lure is drawn through a body of water, the curved shape causes the lure to rotate in one direction and provide a motion which attracts the attention of fish in the vicinity.

The bimetallic member is assembled in a dished or fluted condition. As long as the bimetallic member is held at some predetermined temperature, as, for example, room temperature, it will normally occur in the particular dish shape shown and described. However, with a drop in temperature of some predetermined degree, the lure will, in response to change in the bimetallic combination, be stressed sufficiently to reverse its dished shape. The change in shape takes place rather abruptly, thus causing the lure to dart off suddenly in a manner as if frightened, which is intended to attract the attention of nearby fish.

It is pointed out that when this change in shape is caused to take place rather abruptly with the lure being drawn through the water at a fairly rapid rate of speed, there will be induced a sudden change in the motion of the lure so that it will simulate the sudden, frightened movement of a small fish attempting to escape from a predatory fish.

The numeral 12 denotes a fish line for drawing the lure through with a typical trolling operation. One end of the fish line is attached to a ring 14 located through an opening 16 in the lure body 2. The numeral 18 denotes a hook connected to the other end of the lure by means of a ring 20 in another opening 22. Various other arrangements may also be used.

As can be readily appreciated from FIG. 2, the bimetal body 2 is made up of two discrete layers, each of which is about half the thickness of the body, i.e., the metal layers being of about the same thickness. In one form, the bimetal body 2 may be made up of brass and Invar. The Invar is essentially unresponsive to temperature differentials, whereas the brass layer has a large temperature coefficient of expansion. In both layers, the crystals of the metal are dense, and in this manner also resist the corrosive influence of the water.

As a specific example of the invention, I constructed a lure of brass and Invar having a thickness of 0.003", with each layer being 0.0015". The peripheral shape was that of a teardrop, as seen generally in FIG. 3. For this purpose, the principal axis length was 2" and the minor axis length was 1" and was operative to "flip," i.e., reverse its shape at 48° F.

I find that maintaining the ratio of the minor axis length to the major or principal axis length below about 0.7 results in optimum lure operation, i.e., spinning, as contrasted to planing through the water. Further, preferred operation occurs at ratios in excess of 50 for the lateral area to the cross-sectional area. Advantageously, this ratio is in the range of 150–500. Large lures can be as big as 50 sq. in. in surface area and having thicknesses up to 0.4".

Ideally, the thickness should be increased as the major axis increases—about 0.00125" for each ½" in excess of the minor axis. In the example given, the 0.003" thickness was characterized by a Vickers hardness number of 205±20 on the high expansion side (brass) and 220±20 on the low expansion side (Invar).

The deflection of the hook end of the lure is derived from the following equation:

$$X = \frac{C_2(T_2-T_1)L^2}{t}$$

where $C_2$ is the thermal activity coefficient where each metal thickness is the same, here being $108 \times 10^{-7}$, $T_2-T_1=43°$ F., $L=$lure length, here being 2", and $t=$lure thickness, here being 0.003".

Solution of the equation yields a deflection of 0.619". I consider 0.125" the minimum acceptable deflection in lures, preferring a bimetal providing a thermal coefficient $C_2$ of not less than $80-120 \times 10^{-7}$ before finishing—such as plating, color dipping, etc. Such added materials lower the thermal activity, so after such contributions the resultant activity should be greater than $20 \times 10^{-7}$ for effective operation.

It will be appreciated that a wide variety of metals and alloys are available for constructing the bimetal body. An important factor is that the layers constituting the bimetal, or, in some cases, the polymetal, have different coefficients of expansion. For example, nickel, chromium, and iron alloys, such as 36% nickel, 12% chromium, and 52% iron, as well as nickel, cobalt and iron alloys such as 31% nickel, 4–6% cobalt, with the remainder iron, possess coefficients of expansion from slightly negative $(-0.5 \times 10^{-6})$ through zero to positive coefficients of expansion. Invar has nearly a zero coefficient of expansion, while Nilvar does have a zero coefficient of expansion. Both have an invariable modulus of elasticity in the range of temperature here used. Unless an alloy such as Nilvar of Invar is used with a metal or alloy of great thermal mobility like brass, enormous radii of curvature result which preclude satisfactory operation.

The deformation characteristic of the inventive lure, upon thermal change, is utilizable in another aspect, namely, color. Under one condition, one color is dominant or on the outside face of the lure as it rotates, then under another condition, such as lower temperature, the color of the surface that was less reflective due to being in a concave disposition in the lure, becomes convex and dominant. Thus, it is possible to allow interposition of colors automatically as the lure is performing its function of attracting fish.

I may also employ the principle of a bimetallic lure in various other ways. For example, in FIGS. 3 and 4, I have shown the tear-shaped form of fishing lure just described which comprises the same bimetallic member 26 but which additionally has two bimetallic portions 28 and 30. These portions 28 and 30 are oppositely dished and the lure is preferably formed in the outline of a fish. Openings as at 32 provide for attaching a fish line, and the opening 34 is adapted to have connected therein a fish hook of the type shown in FIG. 1. When the dished portions 28 and 30 are caused to snap in and out due to temperature changes in water, the lure assumes a sinuous shape and darts off in varying directions.

In FIGS. 5 and 6, I have shown another form of the invention comprising a thin plastic lure body 36 which may be of varying shape and which is provided with a bimetallic strip 38 embedded centrally of the plastic body. The plastic body may include an eye 40 for attaching a fish line at one end and an eye 42 for attaching a hook at the opposite end. In this form of the invention, I may also employ additional bimetallic strips as at 44 and 46 which extend transversely with respect to the longitudinal bimetallic strip. This arrangement is intended to illustrate the use of a plurality of bimetallic portions operating at different temperature values.

In the modifications of the invention seen in FIGS. 3–6, the bimetal portions or inserts, as the case may be, again are constructed of a plurality of layers of metal wherein each layer is of a different material and is essentially of the same thickness as the other layers.

In FIG. 7, I have illustrated still another arrangement, consisting of a spinning lure 48 which includes a length of bimetallic material in elongated form. The length of bimetallic material occurs with reversed orientation so that alternate bending in one direction and another may be induced in response to changes in temperature. In this way, the lure is caused to continuously change shape with small fluctuations in temperature. One end of this elongated bimetallic member is formed with an eye 50 for attaching a fish line, and the opposite end is provided with an eye 52 for connecting a fish hook.

In combination with this elongated bimetallic member of reversed orientation construction, I also provide dished bimetal spinner vanes as 54, 56 and 58. These bimetallic vanes are adapted to produce a series of changes in rapid succession to constantly induce change in the direction of travel of the lure so as to simulate the movement of a fish swimming through water. The members 54, 56 and 58 may be made in various ways, including the use of bimetallic sheets combined with plastic sheets, or the use of bimetallic strips as exemplified by the strip 59 in FIG. 10.

In FIGS. 11 and 12, I have illustrated a somewhat different form of fishing lure which is designed to carry out a number of different functions as noted below. This lure includes a body portion 100 formed with a chamber 102. An eye 102a is employed to provide a means for attaching a fish line, suggested fragmentarily in the left-hand side of FIG. 11, and fish hooks as 102b and 102c are fastened at suitable points at the rear of the lure body as also suggested in FIG. 11.

Supported within the chamber 102 is a vane member 103 which is attached to a block B by screws S and $S^1$ located through the upper body section of the lure. The vane 103 may be constructed of several different types of flexible material. In one preferred form, the vane comprises a bimetallic member of curved form which extends through an opening 100a. The opposite end of the vane 103 is adjustably contained against a cap 104 on a reduced section of the screw 101 which is located through the upper section of the lure body. Threaded onto this reduced end of screw 101 is a nut 130 which retains a spring member 105 in compression against the vane member 103, as shown, and provides compensation for effects of currents and fluctuations of trolling speed. Here it is set for a minimum trolling speed. The spring 105 acts as a trolling speed compensator, and, as mentioned, is set for a minimum trolling speed. As increases occur, the spring 105 becomes compressed, allowing the vane 103 to change its angle sufficiently to keep the lure from reacting to the increased speed—as by moving to a more upward position.

By adjusting nut 130, the spring 105 may be set to hold the vane in any desired starting position when the lure is placed in a body of water. It will also be apparent that when the adjusting screw 101 is moved up or down, the bimetallic vane 103 is moved forwardly or rearwardly into positions indicated diagrammatically by the dotted lines 103a and 103b.

It will be seen that by thus varying the position of the vane, a variation in turning moment may be realized and the maximum turning moment is produced when the vane 103 is in the position indicated by the dotted line 103a. Also, it is found that when the vane is in position at 103a, the angle is such as to deflect a flow of water through the opening 100a which exhausts through the passageway 115a. The passageway 115a then functions in the nature of a venturi tube, creating a relatively greater pressure on the upper side of the lure body and tending to force the front end of the lure body downwardly. It is intended that the vane 103 may operate in other positions such as the position indicated by the dotted line 103b. In such case, as the lure goes into colder water, the vane, in its forwardly disposed position, exerts a much smaller turning moment so that the lure may have a tendency to be redirected upwardly rather than downwardly.

With the vane 103 in the position shown at 103b, there is a diminishing in the force of water jetting out of the venturi in passage 115a and there may also be a flow of water through the port 114, which, properly regulated, can tend to force the rear of the lure downwardly. Thus, it will be observed that the vane, set in a predetermined position, will respond to changes in temperature of water encountered as the lure is moved, and these changes in temperature will be effective to change the lure's direction of travel in various ways from time to time.

I may also provide for moving the vane 103 by a bellows member D which contains a fluid capable of expanding or contracting with changes in temperature. Similarly, I may employ a device such as a Bourdon tube in place of the bellows member. Assuming it is known that a certain species of fish will tend to seek a certain water temperature, as, for example, small mouth bass and brown trout, which are known to feed in water of 65° F., then the arrangement described in the lure of FIGS. 11 and 12 can be calibrated to move up and down in a range of temperatures occurring just above or just below this 65° F. range. It will also be observed that by controlling the pressures of water moving in and out of the lure, it becomes possible to produce an undulating path of travel which will attract the attention of fish. Similarly, other settings may be employed to seek out fish at other depths.

The lure body 100 is, in accordance with the invention, further provided with means for releasing a material designed to function as a scent or bait. As shown in FIG. 11, the chamber 109, closed by a cover 110, is formed with a discharge port 108 which is normally shut off by means of a stopper 131 resiliently maintained in a seated position by means of a resilient spring 106 consisting of bimetallic components. The bait is released only when the lure is in the desired water temperature stratum.

The bimetallic components are anchored to the block B and adjustably positioned by means of the screw 101, as shown. Thus, it will be seen that with a suitable setting, a drop in temperature of water may operate to curl the bimetallic member 106 and stopper 131 away from port 108 to permit flow of material out of the chamber 109.

In a preferred form of the invention, the chamber is filled with a liquid bait of some well-known nature so that upon opening the stopper 131, small quantities of this material are allowed to seep into the cavity 102 and out through the passageways 115a, 114 and 125. The port 125 may also be used to provide for cleaning the device when desired.

It is pointed out that the adjustment of the bimetallic member 106, being on the same actuating screw 101 which controls vane 103, it becomes possible to release the scent or bait at such times as the vane 103 has been actuated by temperature changes causing the lure to move into a different depth of water. Therefore, when the lure moves into this different level or depth, there is an immediate release of the bait in this particular region.

The adjustment screw 101 may include a dial 101a by means of which the number of turns of the screw may be regulated in accordance with varying water depths scaled to show different species of fish, as shown in FIG. 12. Also the temperature bellows reacts to water pressure changes.

Still another change which I may produce by means of the lure body 100 relates to causing a sound under water to attract the attention of fish. For example, at the front of the lure body, I may equip the port 115 which communicates with the restricted passageway 115a with a screen 115b. The restricted passageway is designed to function as a venturi tube so that water moving through the screen and port will move at high velocity as it passes through the restricted passage 115a. In the path of this higher velocity water, I locate a paddle wheel 116 which is adapted to be rotated by the flow of water.

The radial blades of the paddle wheel 116 or equivalent are arranged to strike against a bimetallic strip 120 anchored at 102a. As the paddle wheel turns, the frequency of clicks caused by contact of the radial vanes of the wheel with the bimetallic member 20 increases to produce a sustained buzzing sound which is designed to attract the attention of fish. A resonating chamber 117 supports the bimetallic member 120 and is protectively contained so that the ability of the bimetallic member to vibrate is protected. It is desirable to keep the pressure within the cavity 121 from building up with water. Therefore, I provide for the venturi passageway 115a communicating with this chamber 121, as shown. This arrangement tends to evacuate water and lower the pressure from cavity 121.

From the foregoing description it will be seen that I have disclosed a temperature-sensing fish lure which will respond to change in temperature at varying water depths to actuate any one of a number of operations for facilitating the capture of fish.

Referring now to the third sheet of drawings and in particular to FIG. 13, a modified form of lure is seen which is uniquely stressed to provide superior operation. In FIG. 13, the lure is designated generally by the numeral 201, and is seen to be elongated and tapered. At the wider end, the usual opening 202 is provided which serves as a mounting for the fish hook 203. At the narrower end, a second opening 204 is provided to which the swivel 205 is secured, the swivel in turn being secured to a fish line 206 seen only in fragmentary form.

As before, the lure body 201 is constructed of bimetallic material, i.e., a thermally responsive or active material such as brass having an appreciable coefficient of thermal expansion, and a thermally-insensitive or inactive material such as Invar, which has a coefficient of thermal expansion in temperatures normally encountered in fishing of about zero.

In the fabrication of the lure body 201 of FIG. 13, the body is first stressed to provide a longitudinal curvature as seen in FIG. 14, with the thermally-active metal face being concave as at 207. Thus, it follows that the Invar, in the example given, is convexly disposed as at 208. The deformation shown can be achieved by suitably inscribing the body 201 with a series of spaced-apart, transversely-extending lines, or because of the thickness of the body, can be literally rolled over a suitable rigid work-holder or anvil. Excellent results are obtained where the offset of the central portion of the body 201 is of the order of ¼" relative to the longitudinal extremes of the body 201.

Thereafter, the body 201 is further stressed according to the showing in FIG. 15, where a transverse curvature is introduced—here, however, the face of the thermally-active metal being disposed concavely. This is designated in FIG. 15 by the fact that the Invar layer 208 is seen to be facing upwardly as in FIG. 14, but is transversely concave. Again, this arcuate strain can be developed by suitable scribe marks or by a further rolling deformation over a suitable anvil. I find that excellent results are obtained when the degree of offset of the center of the body relative to the transverse edges is of the order of 1/16".

Still further, beneficial results are obtained when the lure is further arcuately deformed at the narrower end as indicated by the dotted line showing designated 201a in FIG. 14. The various strains represented by the showings in FIGS. 14 and 15 have been incorporated in the respective showing in FIG. 13, FIG. 13 also showing subsequent steps in the fabrication wherein the fish hook 203, swivel 205, etc., are connected to the lure body 201.

With a lure body of the compound curvature character specified, advantageous operation in use is afforded, since the lure can snap from one configuration to the other not only because of thermal differences encountered but also by virtue of the water pressure on the same when the lure is being drawn through the water. For example, a sharp tug may result in the application of pressure near the center of the lure to result in a change in configuration independently of the surrounding temperature. Inasmuch as it is advantageous at times to change the configuration quickly when the lure is in the hands of the fisherman, I provide a dot or other visual indication as at 209 whereby the fisherman may press at this point and change the lure from the "hot" condition shown to the "cold" condition. In the cold condition, the brass contracts so as to overcome the transverse curvature shown in FIG. 15 and develop essentially the showing in FIG. 14.

I find also that the provision of the additional flare or curvature introduced at 201a is helpful as developing an additional mechanical force on the lure tending to change its configuration when the line is drawn swiftly through the water. In the showing of FIGS. 13–15, I have merely depicted the basic layers of the bi-metal material, but it will be understood that additional layers may be employed such as chromium plate for corrosion resistance, paint, or other types of "glitter" deemed advantageous to attract the attention of fish.

The concept of a pressure point represented by the dot 209 in FIG. 13 is utilized specifically in the showing of FIG. 16 where the lure body is designated 301, the hook 303, and the swivel 305. It will be seen that the swivel is connected to a lever member generally designated 310, which has a loop as at 311 inserted through the upper eye or opening 304 of the lure body. The loop 311 is positioned intermediate the ends of the lever member 310, one end being connected to the swivel as at 312, and the other end being equipped with a laterally projecting leg portion as at 313 bearing against a pressure spot corresponding to that seen in FIG. 13 and which in FIG. 17 is designated by the numeral 309. It will be appreciated that in FIGS. 16 and 17 the lure body 301 is depicted in its "cold" condition, the spot 309 being provided on the face of the thermally-inactive metal—consistent with the showing in FIG. 13.

A still further version of the improved lure is seen in FIGS. 18 and 19, where a pair of lure bodies 401 and 401'—substantially identical in construction—are seen. These are secured together by means of a ring 405a connected to the swivel 405. The ring also carries a weight mounting member or wire 414, on which weights 415 and 416 are slidably mounted. In operation, the weights 415 and 416 perform the usual function of causing the lure to gravitate through the water, but in another aspect are advantageously utilized to deform the lure bodies 401 and 401', as can be seen in FIG. 19. There, the lure of FIG. 19 is seen in inverted condition, with the weights 415 and 416 moved from the positions shown in FIG. 18 wherein the weight 415 is now more closely spaced to the ring 405a than in the FIG. 18 showing. This permits a squeezing action on the lure bodies 401 and 401', with the weight 416 being positioned approximately in the area of the reverse deformation spot, i.e., the place where the compound curvature can be reversed corresponding to the designations 209 and 309 in FIGS. 13 and 17, respectively. Also, when the weights or beads 415 and 416 are in the position shown in FIG. 18, it is possible to lessen the deformation, since then the end flare (corresponding to that designated 201a in FIG. 14) can be easily relieved. The weights additionally may be colored, if desired, and as can be seen, are largely concealed in the warm condition but exposed under conditions of cooling.

Through the invention, I have provided a lure which is readily adjustable according to the taste of the fisherman and also the requirements of the fishing conditions. To develop the desired reflexing action, greater or lesser curvatures can be readily introduced, it being realized that the greater the curvature on the lure, the lower the temperature of the surrounding water must be to develop a reversal. Also, through the provision of the compound curvature, it is possible to mechanically reverse the curvature of the lure without waiting for the surrounding temperature to achieve the same, in some instances there being a considerable time delay to permit sufficient heat transfer.

While in the foregoing specification a detailed description of embodiments of the invention have been set down for the purpose of explanation thereof, many variations in the details herein given may be made by those skilled in the art without departing from the spirit and scope of the invention.

I claim:
1. In a fish lure, an elongated slightly dished, bimetallic body having a fish hook attached to one end thereof and a fishing line attached to the other end thereof, said body being made up of two discrete layers of metal, each of said layers having a thickness of approximately 0.0015 inch, one of said layers being constructed of brass and the other of said layers being constructed of any one of the group consisting of Nilvar and Invar, said dished body being adapted to reverse its concavity due to the stresses caused by differences in linear dimension changes in the bimetallic body due to a substantial temperature change as the lure moves in a body of water from an area of one temperature to a different area in which the temperature is substantially different.

2. In a fish lure, an elongated, slightly dished bimetallic body having a fish hook attached to one end thereof and a fishing line attached to the other end thereof, said body including at least two discrete layers of metal, each of said layers having a thickness of a fraction of an inch with the metals in the two layers being different and having substantially different coefficients of thermal expansion, said dished body being adapted to reverse its concavity due to the stresses caused by the differences in linear dimension changes in the body due to a substantial temperature change as the lure moves in a body of water from an area of one temperature to a different area in which the temperature is substantially different.

3. The lure of claim 2 in which said body has said layers confined to one portion thereof, the remaining portion of said body being constructed of non-layered material.

4. The lure of claim 2 in which said dishing is provided by introducing a generally longitudinal concave strain in an elongated lure in the metal having a greater coefficient of thermal expansion than the other, said dishing also being achieved by introducing a generally transverse concave strain relative to the metal having the lesser coefficient of thermal expansion.

5. The lure of claim 2 in which fulcrum means are connected to the other end of said body for mechanically changing the body shape.

(References on following page)

References Cited by the Examiner

UNITED STATES PATENTS

| | | | |
|---|---|---|---|
| 341,261 | 5/1886 | McHarg | 43—42.32 |
| 520,594 | 5/1894 | Harlow | 43—42.19 |
| 1,928,367 | 9/1933 | Buddle | 43—42.5 X |
| 2,192,563 | 3/1940 | Starkey | 43—42.53 |
| 2,450,253 | 9/1948 | Parnell | 43—42.23 X |
| 2,562,685 | 7/1951 | Adams | 73—378.3 |
| 2,580,733 | 1/1952 | Cowden | 43—42.22 |
| 2,666,275 | 1/1954 | Smith | 43—42.06 |
| 2,679,227 | 5/1954 | Symonds. | |
| 2,708,806 | 5/1955 | Siebert | 43—42.33 |
| 2,727,962 | 12/1955 | Vaughan | 200—113.7 X |

OTHER REFERENCES

"Truflex Thermostat Metals," catalog published by General Plate Division of Metals and Controls Corp., Attleboro, Mass., U.S.A. (4 pages).

ABRAHAM G. STONE, *Primary Examiner.*

R. L. HOLLISTER, *Assistant Examiner.*